United States Patent
Bosma et al.

(10) Patent No.: US 7,272,850 B2
(45) Date of Patent: Sep. 18, 2007

(54) TURNKEY DATA SECURITY

(75) Inventors: John Hans Handy Bosma, Cedar Park, TX (US); Yen-Fu Chen, Austin, TX (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 10/666,813

(22) Filed: Sep. 18, 2003

(65) Prior Publication Data

US 2005/0066192 A1 Mar. 24, 2005

(51) Int. Cl.
G06F 17/30 (2006.01)

(52) U.S. Cl. .................. 726/2; 726/4; 726/17; 726/21; 726/27; 713/155; 713/164; 713/166; 707/9; 709/225; 709/229; 705/54

(58) Field of Classification Search .................. 726/2, 726/4, 17, 21, 27; 713/155, 164; 707/9; 709/225, 229; 705/54
See application file for complete search history.

(56) References Cited

U.S. PATENT DOCUMENTS

| 5,721,780 A | 2/1998 | Ensor et al. .................. 380/25 |
| 5,774,051 A | 6/1998 | Kostusiak .................. 340/539 |
| 6,035,404 A * | 3/2000 | Zhao .............................. 726/6 |
| 6,516,315 B1 * | 2/2003 | Gupta .......................... 707/9 |

* cited by examiner

*Primary Examiner*—Kim Vu
*Assistant Examiner*—Baotran N. To
(74) *Attorney, Agent, or Firm*—David A. Mims, Jr.; Rudolf O. Siegesmund; Gordon & Rees, LLP

(57) ABSTRACT

The invention comprises a Security Program (SP), a Simultaneous Approval Program (SAP), an Access Approval Program (AAP), and a Security Table (ST). A user's ability to access low security and high security applications depends on the user's security clearance, which is recorded in the ST. The SP limits a user's access to the applications. When a plurality of authorized users have logged in, the SP runs the SAP and AAP as required to allow the users to access and modify the high security applications. The SAP allows a user to modify the high security application only when a specified number of users approve the modification. The AAP allows a user to access a high security application only upon another user's approval. The SP terminates the users' access to the high security applications if one of the users logs out.

32 Claims, 5 Drawing Sheets

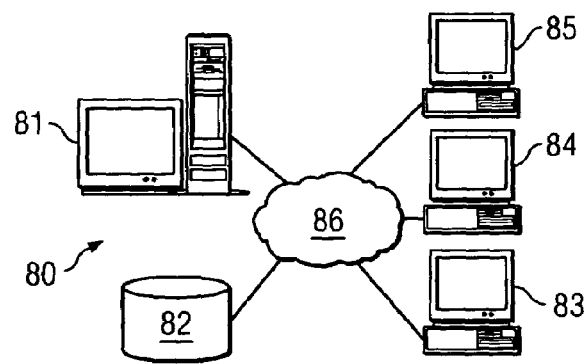
*FIG. 1*
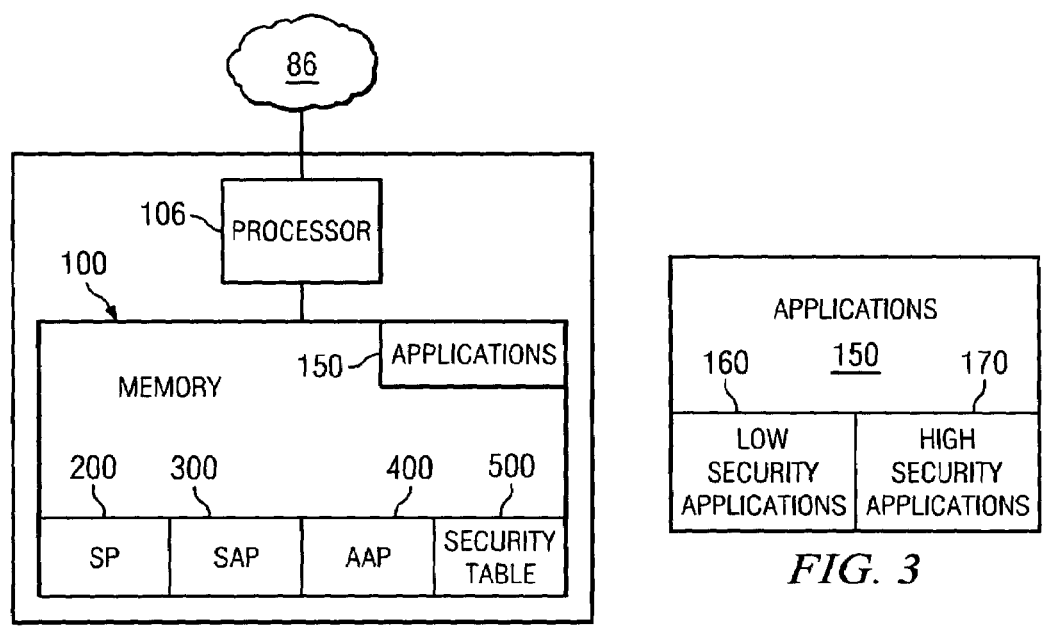
*FIG. 2*
*FIG. 3*

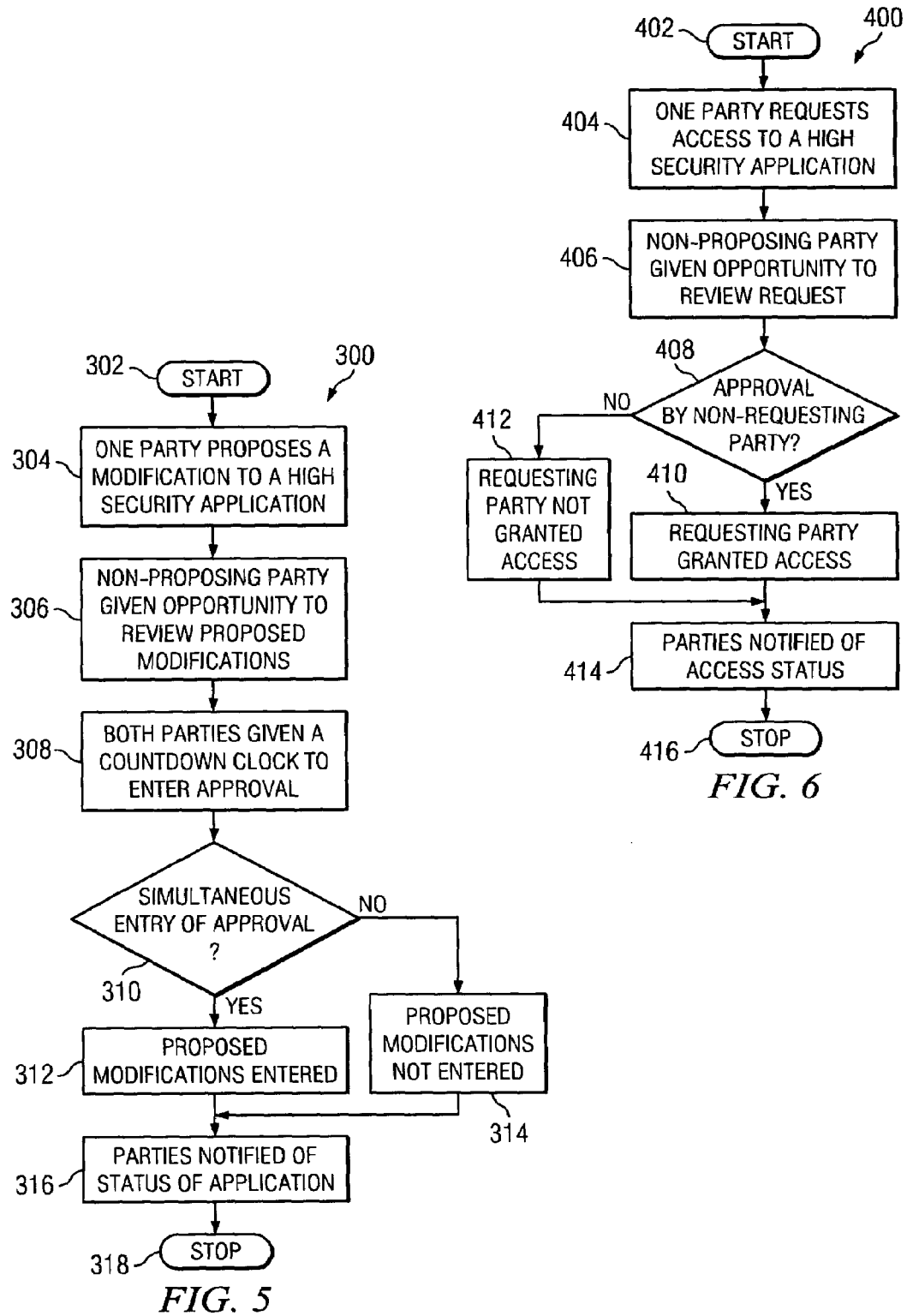

| USER | SECURITY CLEARANCE |
|---|---|
| 502 — ALBERT | LOW |
| 504 — BETTY | LOW; HIGH WITH CHARLIE AND DAN LOGGED IN |
| 506 — CHARLIE | LOW; HIGH WITH BETTY OR DAN LOGGED IN |
| 508 — DAN | ACCESS TO BOTH LOW AND HIGH; MODIFICATIONS TO HIGH WITH APPROVAL FROM CHARLIE |
*FIG. 7*
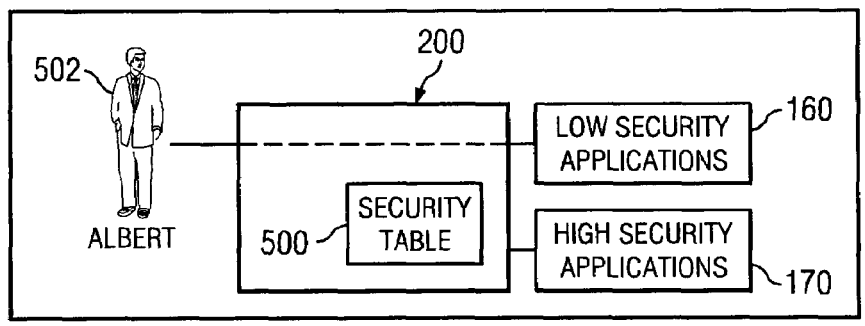
*FIG. 8*
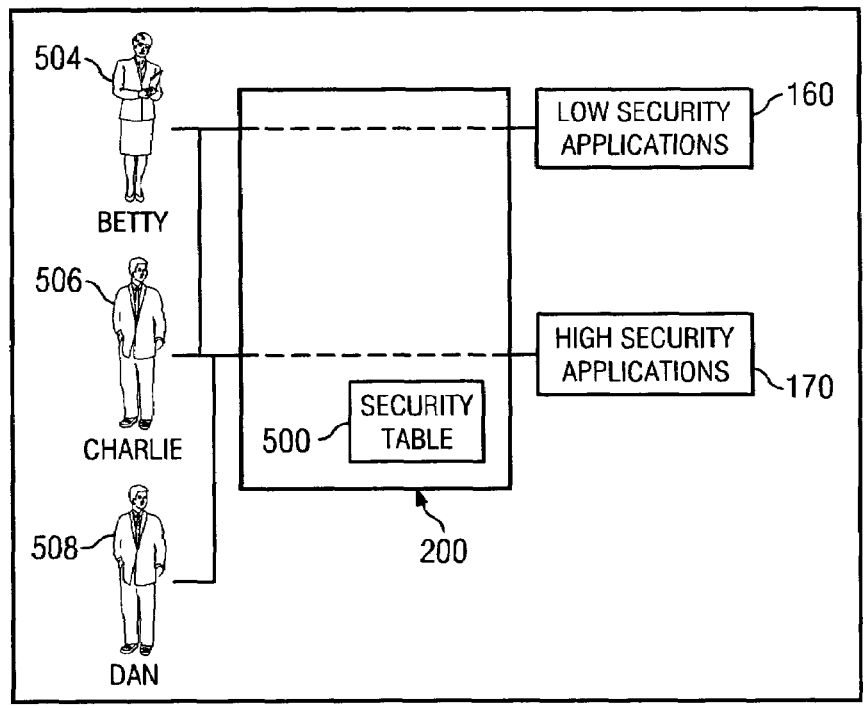
*FIG. 9*

TURNKEY DATA SECURITY

FIELD OF THE INVENTION

The present invention is related generally to computer security and specifically to a software program requiring approval from a plurality of persons before a user can access or modify an application.

BACKGROUND OF THE INVENTION

Each year the cost of dealing with security attacks on computer networks increases. Concomitantly, the frequency of security attacks on computer networks increases. Therefore, the need for improved computer network security also increases. A basic method for computer network security is to limit physical and electronic access to the computer network. Limiting physical access to a computer network has been accomplished by placing computers in the network in a secure physical location and then limiting access to the secure physical location by using security guards to ensure that only authorized persons enter the secured location. Limiting electronic access to a computer network has traditionally been accomplished by requiring entry of both a user name and a password at login.

However, as the need for security increases, so does the need for more sophisticated computer network security systems. One type of physical security measure that has been effective in the military, financial, and governmental sectors is simultaneous turnkey authorization. Simultaneous turnkey authorization occurs when two people, each having a unique key, simultaneously insert, and turn their unique keys in order to indicate their dual approval of an action. The unique keys usually fit into locking cylinders which are far enough apart to prevent the same person from simultaneously turning both keys. A need exists for a method of taking the inherent double layer of physical security achieved by simultaneous turnkey authorization and applying the double layer of security electronically in a computer network.

A second physical security method is to require approval of actions or modifications to a sensitive or crucial system. In this type of security precaution, one person prepares and signs a transaction document and, at a later time, a second person reviews the document and indicates approval by also signing the document. The time delay in the subsequent review and approval provides an opportunity for the first person to identify gaps in the security which he may later exploit. Therefore, a need exists for an improvement in a dual signature method of security that provides real-time approval and accountability while preventing exposure of the security system to analysis by someone seeking to defeat the security system.

Another physical security method is to always have at least two people present when accessing a high security application. The dual access requirement deters wrongdoers with the knowledge that someone else will be aware of their access to the high security application. The second person is physically present and can monitor the first person's navigation of the high security application. Moreover, the second person who is physically present can approve any changes and or modification made by the first person. To this end, a need exists for a method of applying the physical security principle of dual access to electronic access in a computer network. A need also exists for a method of allowing the approving person to electronically monitor the accessing person's navigation of the high security application.

The prior art has previously attempted to solve the needs identified above. For example, U.S. Pat. No. 5,774,051 (hereinafter, the '051 patent) discloses a method of activating an alarm in which a pair of keys are simultaneously actuated. The '051 patent discloses a method for indicating alternative modes of operation by repeatedly actuating a single key. However, what is needed beyond the '051 patent is a method and apparatus for limiting access to high security applications and requiring simultaneous approval of any modifications to the high security applications.

SUMMARY OF THE INVENTION

The present invention, which meets the needs stated above, is a method implementable in computer software as a Security Program (SP), a Simultaneous Approval Program (SAP), an Access Approval Program (AAP) and a Security Table (ST). The SP divides applications into low security applications and high security applications. A user's ability to access the low security applications and the high security applications depends on the user's security clearance, which is recorded in the ST. The SP limits a user's access to the applications. The SP prevents access to the high security application until a plurality of authorized users have logged in. When a plurality of authorized users have logged in, the SP runs the SAP and AAP as required to allow the users to access and modify the high security applications. The SAP allows a user to modify the high security application only when a specified number of users approve the modification. The AAP allows a user to access a high security application only upon another user's approval. The SP terminates the users' access to the high security applications if one of the users logs out.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is an illustration of a computer network used to implement the present invention;

FIG. 2 is an illustration of a computer including a memory and a processor associated with the present invention;

FIG. 3 is an illustration of the classification of applications within the present invention;

FIG. 5 is an illustration of the logic of the Simultaneous Approval Program (SAP) of the present invention;

FIG. 6 is an illustration of the logic of the Access Approval Program (AAP) of the present invention;

FIG. 7 is an illustration of the security table of the present invention;

FIG. 8 is an illustration of the application of the security classification from the security table for Albert;

FIG. 9 is an illustration of the application of the security classification from the security table for Betty;

DETAILED DESCRIPTION OF THE PREFERRED EMBODIMENT

Figure 4:
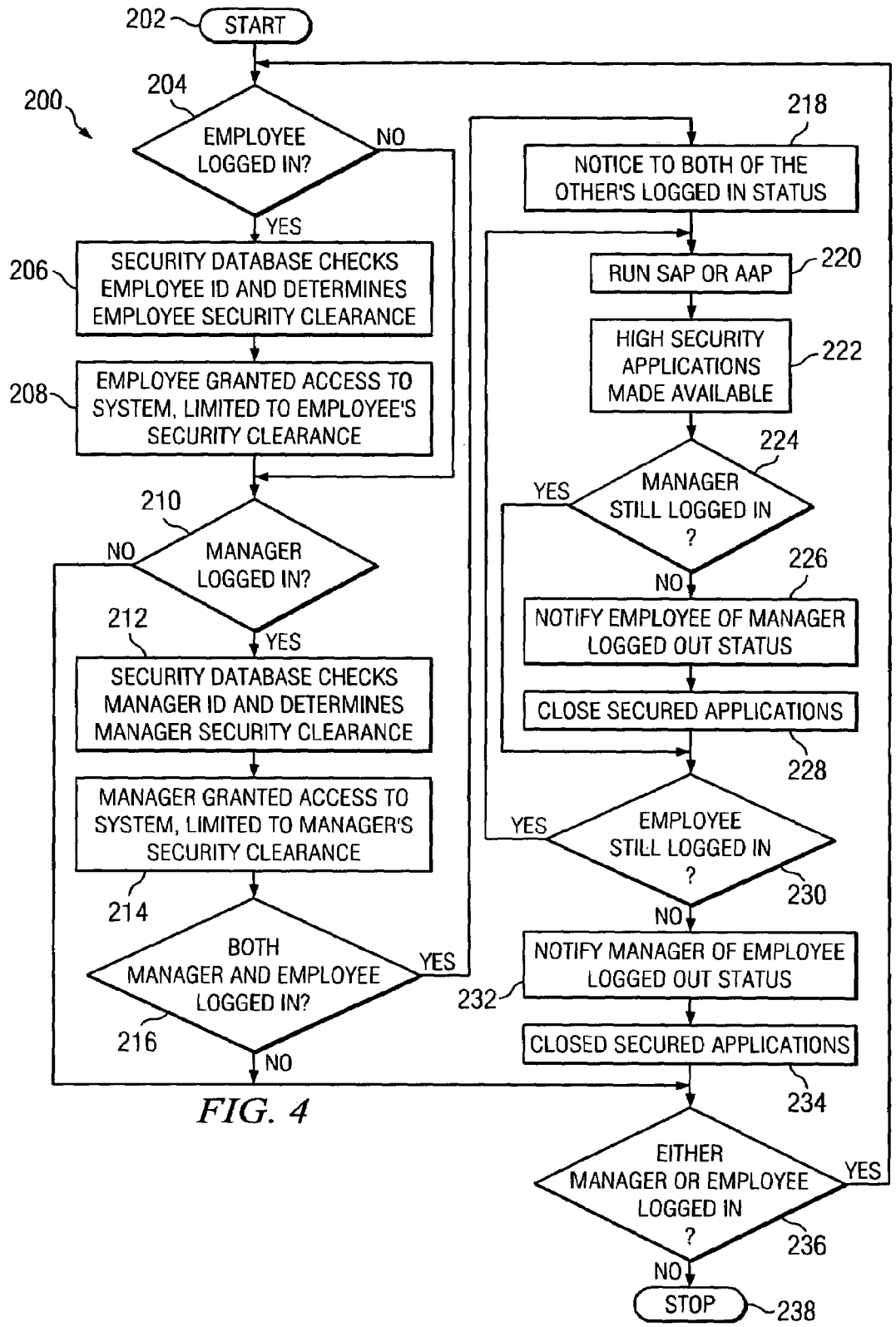
FIG. 4 is an illustration of the logic of the Security Program (SP) of the present invention.

As used herein, the term "access" shall mean to open, view, or obtain data from an application.

As used herein, the term "application" shall mean a computer program or data record and includes applications, files, databases, file systems, and any other type of data record or computer program.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "employee" means an individual who has access to low security applications and who can only access or modify high security applications with the approval of a manager.

As used herein, the term "high security application" shall mean an application, access to which is limited to designated persons and so that a user can only access the application when one or more designated persons other than the user are aware of the user's access to the application.

As used herein, the term "low security application" means an application which is accessible to any user on a network.

As used herein, the term "manager" shall mean an individual who has access to high security applications or high and low security applications. The manager can approve employee access and/or modification of high security applications.

As used herein, the term "modify" shall mean to interact with, run, add data to, or use an application.

As used herein, the term "monitor" shall mean to view another user's screen or to create a history of another user's access and/or modification of an application.

As used herein, the term "terminate" shall mean to close or suspend a secured application.

FIG. 1 is an illustration of computer network 80 associated with the present invention. Computer network 80 comprises local computer 85 electrically coupled to network 86. Local computer 85 is electrically coupled to remote computer 84 and remote computer 83 via network 86. Local computer 85 is also electrically coupled to server 81 and database 82 via network 86. Network 86 may be a simplified network connection such as a local area network (LAN) or may be a larger network such as a wide area network (WAN) or the Internet. Furthermore, computer network 80 depicted in FIG. 1 is intended as a representation of a possible operating network that may contain the present invention and is not meant as an architectural limitation.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Security Program (SP) 200, Simultaneous Approval Program (SAP) 300, and Access Approval Program (AAP) 400. SP 200, SAP 300, and AAP 400 described herein can be stored within the memory of any computer depicted in FIG. 1. Alternatively, SP 200, SAP 300, and AAP 400 can be stored in an external storage device such as a removable disk, a CD-ROM, or a USB storage device. Memory 100 is illustrative of the memory within one of the computers of FIG. 1. Memory 100 also contains applications 150 and security table 500. The present invention may interface with applications 150 and security table 500 through memory 100. As part of the present invention, the memory 100 can be configured with SP 200, SAP 300, and/or AAP 400. Processor 106 can execute the instructions contained in SP 200, SAP 300, and/or AAP 400. Processor 106 and memory 100 are part of a computer such as remote computer 83 in FIG. 1. Processor 106 can communicate with other computers via network 86.

In alternative embodiments, SP 200, SAP 300, and/or AAP 400 can be stored in the memory of other computers. Storing SP 200, SAP 300, and/or AAP 400 in the memory of other computers allows the processor workload to be distributed across a plurality of processors instead of a single processor. Further configurations of SP 200, SAP 300, and/or AAP 400 across various memories are known by persons of ordinary skill in the art.

Turning to FIG. 3, an illustration of the division of applications 150 within the present invention is illustrated. In FIG. 3, applications 150 are divided into low security applications 160 and high security applications 170. The division illustrated in FIG. 3 is just one possible division of applications 150 and is not meant to be limiting. For example, applications 150 could include intermediate levels of security. Persons of ordinary skill in the art will be aware of other divisions of applications 150.

Turning to FIG. 4, the logic of the Security Program (SP) 200 of the present invention is illustrated. The example illustrated in FIG. 4 involves a manager and an employee, but could involve any combination of two or more people with security clearance. As used herein, the term manager includes any type of supervisor. In FIG. 4, either the employee or the manager may access or modify low security applications. However, the manager and the employee must both be logged in to access or modify the high security applications. However, because SP 200 is not limited to manager and employees, the two parties described herein may be any two parties with limited access to a high security application as identified in security table 500.

SP 200 starts (202) whenever a manager or employee logs in. SP 200 then determines if an employee has logged in (204). If an employee has not logged in, then SP 200 proceeds to step 210. If an employee has logged in, then SP 200 accesses the security database, checks the employee identification, and determines the employee's security clearance level (206). The security database may be like security table 500. SP 200 then grants the employee access to computer network, limited to the employee's security level (208). For example, if the employee were limited to low security applications, then the employee would be able to access and modify the low security applications on the computer network.

SP 200 then determines if a manager has logged in (210). If a manager has not logged in, then SP 200 proceeds to step 236. If a manager has logged in, then SP 200 accesses the security database, checks the manager identification, and determines the manager's security clearance level (212). The security database may be like security table 500. SP 200 then grants the manager access to computer network, limited to the manager's security level (214). For example, if the manager has access to low security applications, then the manager would be able to access and modify the low security applications, but not the high security applications, on the computer network. Alternatively, the manager may be able to access but not modify the high security applications by himself.

SP 200 then determines if both the manager and the employee are logged in (216). If the manager and the employee are not both logged in, then SP 200 proceeds to step 236. If the manager and the employee are both logged in, then SP 200 sends a notice to both the employee and the manager that the other party is logged in (218). The notice may be by email, or any other messaging means known to a person of ordinary skill in the art. Moreover, the present invention may include an instant messaging service so that the employee and the manager may communicate over the computer network. Optionally, SP 200 can be configured to send a request to the employee to accept access to the high security applications. In this way, the employee can be given the opportunity to reject access to the high security applications. Another option for which SP 200 may be configured is that the employee may set his acceptance as automatic for the high security application. Where high level security applications may be assigned different levels within the high security application category, the employee may further select access up to and including the highest level of the high security applications, or the employee may select only designated levels within the high security applications. As a further option, SP 200 can be configured so that instead of sending notification and/or prompting for acceptance, SP 200 automatically updates links to the high security applications on the current web page of the employee so that the employee automatically has access while the manager is concurrently logged in. SP 200 then runs SAP 300 or AAP 400, whichever is appropriate (220). SAP 300 is appropriate whenever both parties need to approve a modification to a high security application. AAP 400 is appropriate when an employee needs a manager's approval to access a high security application. When approval is received through SAP 300 or AAP 400, then SP 200 allows the employee or manager to access or modify the high security application (222). SP 200 may be configured so that once the employee has received access to high security applications, the manager will be notified of specific program executions, employee actions, or other events involving the employee's access to the high security application, thereby reducing the need for the manager to monitor the employee's screen. Moreover, SP 200 may be configured so that the manager can elect to receive notification of specific employee actions and may enable those actions by designating them enabled during the period of the manager's log in.

SP 200 then determines whether the manager is still logged in (224). If the manager is still logged in, then SP 200 proceeds to step 230. If the manager is no longer logged in, SP 200 notifies the employee of the manager's logged out status (226). The notification can be done is the same manner as the notification in step 218. SP 200 then closes the secured applications (228). A person skilled in the art will be aware that suspending a secured application is an alternative to closing the secured application. SP 200 can close the secured applications immediately upon manager logout, or can close the secured applications when the employee has finished his pending task. Alternatively, SP 200 can discontinue modification of the secured application but allow continued access to the secured application. SP 200 can be configured for a number of options when the manager logs out and the employee remains logged in. SP 200 may be configured so that the employee may make a request to maintain or extend his authorization when the manager logs off. Such a request may be automatically generated when the manager selects a "log off" action. Alternatively, the employee may be logged off a certain amount of time (i.e. ten minutes) after the manager logs off. Upon such a request by the employee, SP 200 may be configured to allow the manager to delegate authority to the employee before logging off. Alternatively, SP 200 may be configured so that upon such a request, the manager is presented with a display of a predefined backup name list of persons with equal or greater security clearances, so that the manager may designate a backup name and transfer security authority to the person whose name the manager selected from the backup list. Alternatively, the manager may be presented with the company's organization tree wherein SP 200 would only allow selection of a name for transfer of authority provided that the name had equal or greater security clearance in a security table such as example security table 500 (see FIG. 7). Persons of ordinary skill in the art are aware of other methods for closing secured applications when the authorization to access to modify the secured application has ended.

SP 200 then determines whether the employee is still logged in (230). If the employee is still logged in, then SP 200 returns to step 220. If the employee is no longer logged in, SP 200 notifies the manager of the employee's logged out status (232). The notification can be done in the same manner as the notification in step 218. SP 200 then closes the secured applications to the extent that the manager is not allowed to access or modify the secured applications by himself (234). SP 200 can close the secured applications immediately upon employee logout, or can close the secured applications when the employee has finished his pending task. Alternatively, SP 200 can discontinue modification of the secured application but allow continued access to the secured application. Persons of ordinary skill in the art are aware of other methods for closing secured applications when the authorization to access to modify the secured application has ended. SP 200 then determines whether the manager or the employee is logged in (236). If either the employee or the manager is logged in, then SP 200 returns to step 204. If neither the employee nor the manager is logged in, then SP 200 ends (238).

Turning to FIG. 5, Simultaneous Approval Program (SAP) 300 is illustrated. SAP 300 is a program that only allows a party, either an employee or a manager, to modify a secured application when two or more parties simultaneously approve the modification. Thus, SAP 300 creates both real-time approval and accountability for approved modifications. For the purposes of SAP 300, the two parties may be the manager and the employee. However, because SP 200 and SAP 300 are not limited to manager and employees, the two parties described herein may be any two parties with access to a high security application as identified in security table 500. SAP 300 starts (302) when directed by SP 200. Then, one of the parties who have access to a high security application proposes a modification to the secured application (304). The modification may be a software update, a change in the stored data in the secured application, or any other software or data modification known by persons of ordinary skill in the art. SAP 300 then gives the non-proposing party an opportunity to review the proposed modification (306). When the non-proposing party indicates that he has reviewed the proposed modification, SAP 300 gives both parties a countdown clock to enter their approval of the modifications (308). In order for the modifications to be approved by SAP 300, the modifications must be simultaneously approved by both parties. Approval may be by speaking or typing a password, turning a key, by some biometric approval process such as a retinal scan, face recognition, voice recognition, fingerprint identification, or by any other identification confirmation system known to persons of ordinary skill in the art. SAP 300 then determines if the parties simultaneously entered their approval (310). If the parties simultaneously entered their approval, then SAP 300 enters the proposed modifications (312). If the parties did not simultaneously enter their approval, then SAP 300 does not enter the proposed modifications (314). SAP 300 then notifies both parties of the status of the secured application, including whether the proposed modification was entered (316). SAP 300 then ends (318).

Turning to FIG. 6, Access Approval Program (AAP) 400 is illustrated. AAP 400 is a program that allows a party, either an employee or a manager, to access a secured application only when another party approves the access. For the purposes of AAP 400, the two parties may be the manager and the employee. However, because SP 200 and AAP 400 are not limited to manager and employees, the two parties described herein may be any two parties with access to a high security application as identified in security table 500. AAP 400 starts (402) when directed by SP 200. Then, one of the parties requests access to a high security application (404). The access may be a view data, extract data, prepare a modification proposal, or any other reason for accessing a secured application known to persons of ordinary skill in the art. AAP 400 then gives the non-proposing party an opportunity to review the access request (406). In order for the requesting party to access the secured application, the request must be approved by another party. Approval may be by speaking or typing a password, turning a key, by some biometric approval process such as a retinal scan, face recognition, voice recognition, fingerprint identification, or by any other identification confirmation system known to persons of ordinary skill in the art. In approving the request, AAP 400 may allow the approving party to monitor the requesting party's access to the high security application. Monitoring includes being able to view the requesting party's screen and reviewing a history of the access, modifications, and other actions by the requesting party. Alternatively, AAP 400 can specifically prohibit the approving party from monitoring the access, if desired. AAP 400 then determines if the non-requesting party approved the access request (408). If the non-requesting party approved the request, then AAP 400 allows the requesting party to access the high security application (410). If the non-requesting party did not approve the request, then AAP 400 denies the requesting party access to the high security application (412). AAP 400 then notifies both parties of the status of the requesting party's access to the secured application, including access to the high security application (414). AAP 400 then ends (416).

Turning to FIG. 7, an example of security table 500 is illustrated. Security table 500 is a chart which correlates a user's identity with the user's level of security access. For example, in security table 500, there are four users: Albert 502, Betty 504, Charlie 506, and Dan 508. Albert 502 can access and modify the low security applications. Betty 504 can access and modify the low security applications by herself, but may only access or modify the high security applications as long as Charlie 504 and Dan 506 approve her access and/or modification of the high security applications. Charlie 506 can access and modify the low security applications by himself, but may only access or modify the high security applications as long as Betty 502 or Dan 506 approves his access and/or modification of the high security applications. Dan 508 always can access the low security applications and the high security applications. However, Dan 508 may only modify the high security applications with approval from Charlie 506. When dealing with highly sensitive applications, it is preferable to have security classifications more like Albert 502, Betty 504, and Charlie 506 than Dan 508. This is because the possibility of misuse of the secured application is lessened when more than one person is aware of the access and/or modifications to a secured application.

Turning to FIGS. 8-11, the application of the present invention to the persons described in security table 500 is illustrated. In FIG. 8, Albert 502 must traverse SP 200 in order to access low security application 160 and high security application 170. When Albert 502 logs in, SP 200 reviews security table 500 and determines the security clearance for Albert 502. Because security table 500 indicates that Albert 502 only can access and modify the low security applications, Albert 502 is granted access to low security application 160 and not high security application 170.

In FIG. 9, Betty 504 must traverse SP 200 in order to access low security application 160 and high security application 170. When Betty 504 logs in, SP 200 reviews security table 500 and determines the security clearance for Betty 504. Because security table 500 indicates that Betty 504 can access and modify the low security applications, Betty 504 is granted access to low security application 160. Additionally, because security table 500 indicates that both Charlie 504 and Dan 506 must be logged in for Betty 504 to access or modify high security applications, Betty 504 is granted access to high security applications only when Charlie 506 and Dan 508 are both logged in. SAP 300 and AAP 400 may further limit Betty's ability to access and/or modify high security application 170.

Figure 10:
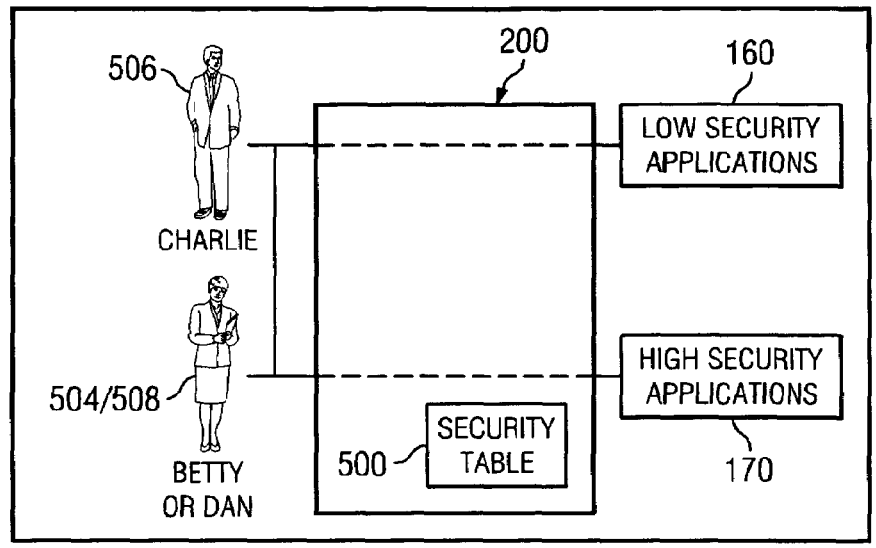
FIG. 10 is an illustration of the application of the security classification from the security table for Charlie.

In FIG. 10, Charlie 506 must traverse SP 200 in order to access low security application 160 and high security application 170. When Charlie 506 logs in, SP 200 reviews security table 500 and determines the security clearance for Charlie 506. Because security table 500 indicates that Charlie 506 can access and modify the low security applications, Charlie 506 is granted access to low security application 160. Additionally, because security table 500 indicates that either Betty 504 or Dan 506 must be logged in for Charlie 506 to access or modify high security applications, Charlie 506 is granted access to high security applications only when either Betty 504 or Dan 508 are both logged in. SAP 300 and AAP 400 may further limit Charlie's ability to access and/or modify high security application 170.

Figure 11A:
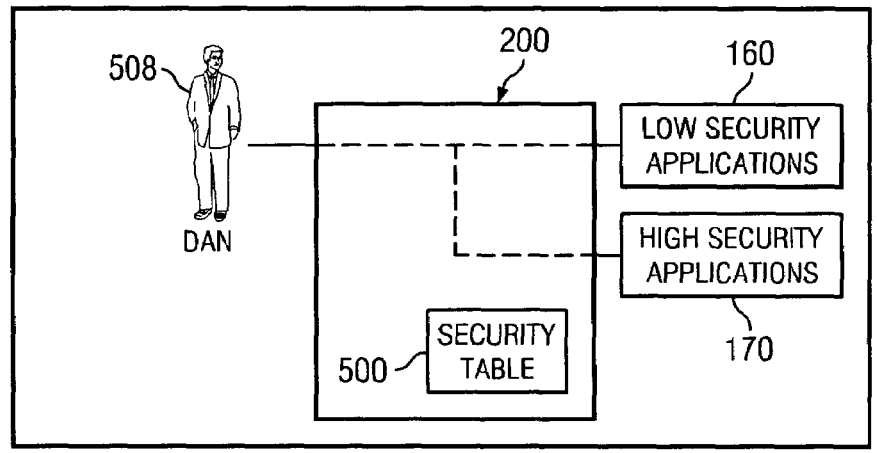
FIGS. 11A and 11B are an illustration of the application of the security classification from the security table for Dan.
Figure 11B:
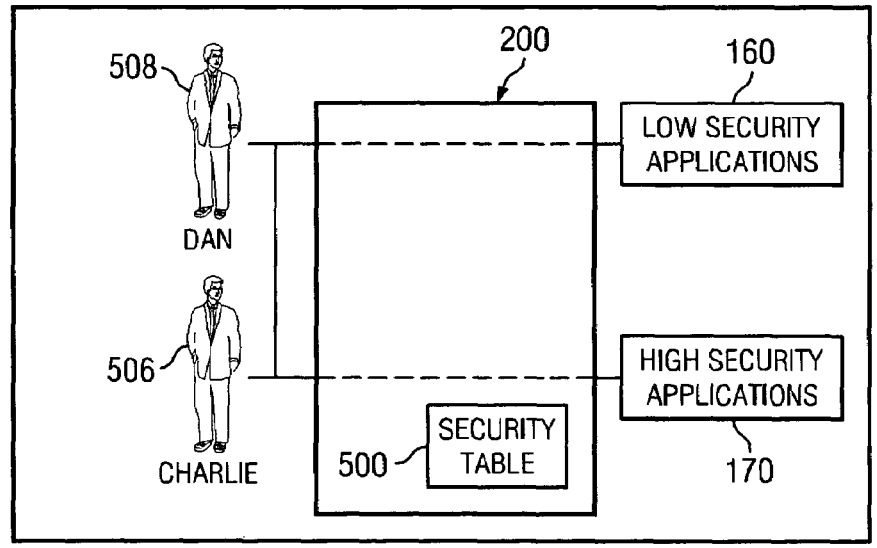

In FIG. 11A, Dan 508 must traverse SP 200 in order to access low security application 160 and high security application 170. When Dan 508 logs in, SP 200 reviews security table 500 and determines the security clearance for Dan 508. Because security table 500 indicates that Dan 508 can access the low security applications and high security applications, Dan 508 is granted access to both low security application 160 and high security application 170. However, as seen in FIG. 11B, SAP 300 limits Dan's ability to modify high security application 170. Here, Dan 508 may only modify the high security application when his modification is approved by Charlie 506.

With respect to the above description, it is to be realized that the optimum dimensional relationships for the parts of the invention, to include variations in size, materials, shape, form, function and manner of operation, assembly and use, are deemed readily apparent and obvious to one of ordinary skill in the art, and all equivalent relationships to those illustrated in the drawings and described in the specification are intended to be encompassed by the present invention. The novel spirit of the present invention is still embodied by reordering or deleting some of the steps contained in this disclosure. The spirit of the invention is not meant to be limited in any way except by proper construction of the following claims.

What is claimed is:

1. A method for limiting the users on a computer network comprising:
   creating a security table having a plurality of access rights;
   determining if both a manager and an employee, each having an equal access right, are logged in;
   responsive to a determination that both the manager and the employee are logged in, allowing the manager and the employee to access to a high security application;
   terminating access to the high security application by the manager and the employee when either the manager or the employee logs out;
   responsive to a determination that both the manager and the employee are logged in, accenting a modification proposal for the high security application by the employee;
   allowing the manger to review the modification proposal;
   providing a countdown clock for simultaneous approval;
   determining if both the manager and the employee simultaneously approved the proposed modification;
   responsive to a determination that both the manager and the employee simultaneously approved the modification proposal, entering the modification proposal into the high security application; and
   responsive to a determination that both the manager and the employee did not simultaneously approve the modification proposal, not entering the modification proposal into the high security application.

2. The method of claim 1 further comprising:
   accepting an employee login; and
   determining the employee's security clearance.

3. The method of claim 2 further comprising:
   accepting a manager login; and
   determining the manager's security clearance.

4. The method of claim 1 wherein the allowing access to the high security application step comprises:
   accepting an access request for the high security application by the employee;
   allowing the manger to review the access request; and
   determining if the manager approved the access request;
   responsive to a determination that the manager approved the access request, allowing the employee to access the high security application; and
   responsive to a determination that the manager did not approve the modification, not allowing the employee to access the high security application.

5. The method of claim 1 wherein the employee accesses the high security application and the manager monitors the employee's access.

6. The method of claim 5 wherein the monitoring comprises: review by the manager of a history log of the employee's access and modifications.

7. The method of claim 5 wherein the monitoring comprises: viewing the employee's screen.

8. The method of claim 1 wherein the manager accesses the high security application and the employee cannot monitor the manager's access.

9. The method of claim 1 wherein the terminating the access to the high security application step comprises: closing the high security application immediately upon logout by either the manager or the employee.

10. The method of claim 1 wherein the terminating the access to the high security application step comprises: terminating only the right to modify and not the right to access the high security application.

11. The method of claim 1 wherein the terminating the access to the high security application step comprises: not allowing a manager or an employee to re-open the high security application after the manager or employee closes the high security application.

12. A program product operable on a computer, the program product comprising:
   a computer-usable medium;
   wherein the computer usable medium comprises instructions comprising:
      instructions for accessing a security table having a plurality of access rights;
      instructions for determining if both a manager and an employee, each having an equal access right, are logged in;
      instructions for responsive to a determination that both the manager and the employee are logged in, allowing access to a high security application;
      instructions for terminating the access to the high security application when either the manager or the employee logs out;
      responsive to a determination that both the manager and the employee are logged in, instructions for accepting a modification proposal for the high security application by the employee;
      instructions for allowing the manger to review the modification proposal;
      instructions for providing a countdown clock for simultaneous approval;
      instructions for determining if both the manager and the employee simultaneously approved the proposed modification;
   responsive to a determination that both the manager and the employee simultaneously approved the modification proposal, instructions for entering the modification proposal into the high security application; and
   responsive to a determination that both the manager and the employee did not simultaneously approve the modification proposal, instructions for not entering the modification proposal into the high security application.

13. The program product of claim 12 further comprising:
   instructions for accepting an employee login; and
   instructions for determining the employee's security clearance.

14. The program product of claim 13 further comprising:
   instructions for accepting a manager login; and
   instructions for determining the manager's security clearance.

15. The program product of claim 12 wherein the allowing access to the high security application step comprises:
   instructions for accepting an access request for the high security application by the employee;
   instructions for allowing review of the access request by the manager; and
   instructions for determining if the manager approved the access request;
   responsive to a determination that the manager approved the access request, instructions for allowing the employee to access the high security application; and
   responsive to a determination that the manager did not approve the modification, not allowing the employee to access the high security application.

16. The program product of claim 12 wherein the employee accesses the high security application and the manager monitors the employee's access.

17. The program product of claim 16 wherein the monitoring comprises: review by the manager of a history log of the employee's access and modifications.

18. The program product of claim 16 wherein the monitoring comprises: viewing the employee's screen.

19. The program product of claim 12 wherein the manager accesses the high security application and the employee cannot monitor the manager's access.

20. The program product of claim 12 wherein the terminating the access to the high security application step comprises: instructions for closing the high security application immediately upon logout by either the manager or the employee.

21. The program product of claim 12 wherein the terminating the access to the high security application step comprises: instructions for terminating only the right to modify and not the right to access the high security application.

22. The program product of claim 12 wherein the terminating the access to the high security application step comprises: instructions for not allowing a manager or an employee to re-open the high security application after the manager or employee closes the high security application.

23. A program product operable on a computer, the program product comprising:
a computer-usable medium containing a plurality of instructions encoded thereon to cause a computer to:
access a security table having a plurality of access rights;
accept a modification proposal for a high security application by an employee having an equal access right to a manager;
allow the manager to review the modification proposal;
provide a countdown clock for simultaneous approval;
determine if both the manager and the employee simultaneously approved the proposed modification;
responsive to a determination that both the manager and the employee simultaneously approved the modification proposal, enter the modification proposal into the high security application; and responsive to a determination that both the manager and the employee did not simultaneously approve the modification proposal, not enter the modification proposal into the high security application.

24. The program product of claim 23 further comprising additional instructions to cause the computer to:
accept an access request for the high security application by the employee;
allow review of the access request by the manager; and
determine if the manager approved the access request;
responsive to a determination that the manager approved the access request, allow the employee to access the high security application; and
responsive to a determination that the manager did not approve the modification, to not allow the employee to access the high security application.

25. The program product of claim 24 further comprising instructions to cause the computer to: allow the employee to access the high security application and to allow the manager to monitor the employee's access.

26. The program product of claim 24 further comprising instructions to cause the computer to:
allow the manager to review a history log of the employee's access and modifications.

27. The program product of claim 24 further comprising instructions to cause the computer to: allow the manager to view the employee's screen.

28. The program product of claim 24 further comprising instructions to cause the computer to: allow the manager to access the high security application and to not allow the employee to monitor the manager's access.

29. The program product of claim 24 further comprising instructions to cause the computer to: terminate access by either the employee or the manger to the high security application when either the manager or the employee logs out.

30. The program product of claim 29 further comprising instructions to cause the computer to: close the high security application immediately upon a logout by either the manager or the employee.

31. The program product of claim 29 further comprising instructions to cause the computer to: terminate only the right to modify and not the right to access the high security application.

32. The program product of claim 29 further comprising instructions to cause the computer to: not allow a manager or an employee to re-open the high security application after the manager or employee closes the high security application.

* * * * *